US012488318B2

(12) United States Patent
Xiao et al.

(10) Patent No.: US 12,488,318 B2
(45) Date of Patent: Dec. 2, 2025

(54) EARNING CODE CLASSIFICATION

(71) Applicant: ADP, Inc., Roseland, NJ (US)

(72) Inventors: Min Xiao, Florham Park, NJ (US); Lei Xia, Parsippany, NJ (US); Manish Karanjavkar, Parsippany, NJ (US); Dmitry Tolstonogov, Parsippany, NJ (US); Xiaojing Wang, Parsippany, NJ (US)

(73) Assignee: ADP, Inc., Roseland, NJ (US)

( * ) Notice: Subject to any disclaimer, the term of this patent is extended or adjusted under 35 U.S.C. 154(b) by 276 days.

(21) Appl. No.: 18/118,110

(22) Filed: Mar. 6, 2023

(65) Prior Publication Data
US 2023/0281563 A1 Sep. 7, 2023

Related U.S. Application Data

(63) Continuation of application No. 16/358,220, filed on Mar. 19, 2019, now abandoned.

(51) Int. Cl.
| | |
|---|---|
| *G06Q 10/067* | (2023.01) |
| *G06F 21/84* | (2013.01) |
| *G06N 3/08* | (2023.01) |
| *G06N 20/00* | (2019.01) |
| *G06Q 10/105* | (2023.01) |
| *G06Q 40/12* | (2023.01) |

(52) U.S. Cl.
CPC .......... *G06Q 10/105* (2013.01); *G06F 21/84* (2013.01); *G06N 3/08* (2013.01); *G06N 20/00* (2019.01); *G06Q 10/067* (2013.01); *G06Q 40/125* (2013.12)

(58) Field of Classification Search
CPC .. G06Q 10/105; G06Q 40/125; G06Q 10/067; G06N 20/00; G06N 3/08; G06F 21/84
See application file for complete search history.

(56) References Cited

U.S. PATENT DOCUMENTS

| | | | |
|---|---|---|---|
| 9,098,831 B1 * | 8/2015 | Miles | ................. G06Q 10/1053 |
| 9,754,233 B1 | 9/2017 | Hamouda | |
| 2014/0344120 A1 * | 11/2014 | Shah | ................... G06Q 40/125 |
| | | | 705/32 |
| 2015/0294257 A1 | 10/2015 | Raza | |

(Continued)

OTHER PUBLICATIONS

Giunchiglia, F., et al, Semantic Matching, [received Jan. 31, 2025]. Retrieved from Internet :<https://www.cambridge.org/core/journals/knowledge-engineering-review/article/abs/semantic-matching/15E94A7320BCD55B789DFACA586470B8> (Year: 2010).*

(Continued)

*Primary Examiner* — Miranda M Huang
*Assistant Examiner* — Bart I Rylander
(74) *Attorney, Agent, or Firm* — Foley & Lardner LLP

(57) ABSTRACT

Managing and applying human resources data comprising aggregating employee transaction data for an organization. A number of human resources-related attributes are evaluated across heterogeneous transaction data. The employee transaction data is classified via statistical machine learning into a number of normalized codes according to the human resources-related attributes, a user interface is presented to adjust a number of organizational operating procedures according to the normalized codes.

20 Claims, 17 Drawing Sheets

(56) References Cited

U.S. PATENT DOCUMENTS

2017/0316080 A1* 11/2017 Brisebois ............... G06N 20/00
2018/0218330 A1 8/2018 Kadambala et al.

OTHER PUBLICATIONS

Minnich, A., et al, ClearView: Data Cleaning for Online Review Mining, [received Jan. 31, 2025]. Retrieved from Internet: <https://ieeexplore.ieee.org/abstract/document/7752290> (Year: 2016).*

Xu, Y., et al, On Splitting Training and Validation Set: A Comparative Study of Cross-Validation, Bootstrap and Systematic Sampling for Estimating the Generalization Performance of Supervised Learning, [received Jan. 31, 2025]. Retrieved from Internet :<link.springer.com/article/10.1007/s41664-018-0068-2> (Year: 2018).*

Ikudo et al, "Occupational Classifications: A Machine Learning Approach", National Bureau of Economic Research, NBER Working Paper Series, Aug. 2018, retrieved from Internet: https://www.nber.org/system/files/working_papers/w24951/w24951.pdf on Apr. 21, 2021, pp. 1-47.

Ikudo et al., "Occupational Classifications: A Machine Learning Approach," IZA Institute of Labor Economics, Discussion Paper Series, IZA DP No. 11738, Bonn, Germany, Aug. 2018, 49 pages.

Jia et al, "A Conceptual Artificial Intelligence Application Framework in Human Resource Management", International Conference on Electronic Business, ICEB 2018 Proceedings, Dec. 6, 2018, retrieved from the Internet: https://aisel.aisnet.org/cgi/viewcontent.cgi?article=1011&context=iceb2018 on Jun. 21, 2021, pp. 106-114.

Kirimi et al, "Application of Data Mining Classification in Employee Performance Prediction," International Journal of Computer Applications (0975-8887), vol. 146, No. 7, Jul. 2016, pp. 28-35.

Masum et al, "Intelligent Human Resource Information System (i-HRIS): A Holistic Decision Support Framework for HR Excellence", The International Arab Journal of Information Technology, vol. 15., No. 1, Jan. 2018, retrieved from Internet on Jun. 21, 2021, pp. 121-130.

Michalak et al, "Graph Mining Approach to Suspicious Transaction Detection", Proceedings of the Federated Conference on Computer Science and Information Systems, 2011, retrieved from Internet: https://ieeexplore.ieee.org/stamp/stamp.jsp?tp=&arnumber=6078254 retrieved on Jun. 28, 2021, pp. 69-75.

US Office Action issued in corresponding U.S. Appl. No. 16/358,220, dated Jan. 12, 2022 (36 pages).

US Office Action issued in corresponding U.S. Appl. No. 16/358,220, dated Jul. 15, 2021 (26 pages).

US Office Action issued in corresponding U.S. Appl. No. 16/358,220, dated May 23, 2022 (33 pages).

US Office Action issued in corresponding U.S. Appl. No. 16/358,220, dated Sep. 6, 2022 (38 pages).

* cited by examiner

FIG. 6A

OUTPUTS:

TO FIG. 6B

Total Compensation Plan
As compensation offered xx xx xxxxxxxx

Direct Compensation - All compensation tied to work performed

Total Cash Compensation

Pay for Work
Pay for activities or time spent on activities that are controlled by and that benefit the employer

Regular Pay
Compensation for standard hours in a standard work week

Overtime Pay
Compensation for hours that exceed the standard

Premium Pay
Compensation for "premium" hours and/or conditions

Additional Pay
Non-Guaranteed compensation that is attributed to some metric or as the result of some process

Performance Bonus
Based on performance of company, team and/or associate

Referral Bonus
Used when talent is scarce and paid to a current worker upon successful hire of an applicant

Spot Bonus
Informal and on the spot recognition of an achievement

Incentive Awards
Compensation that is awarded relevant to incentivizing a longer term of service

Restricted Stock Units
Time-based vesting

Warrant Stock Units
Right to buy company shares at fixed price

Phantom Stock Units
Cash pay tied to stock

Stock Appreciation Rights
Bonus based on appreciation of stock

Stock Purchase Plan
Company shares at advantageous price

Indirect Compensation - All compensation tied to non-wage compensation

Pay for Time Not Worked
Benefits related to formal or extended absences from work; often entails statutory oversight

Sabbatical Leave
Time off for study, rest or travel

Bereavement Leave
Time off as a result of the death of a close relative, friend or associate

Annual Leave
Time off usually allotted in context of year

Jury Leave
Time off to fulfill obligation to serve on jury

Perquisites
Benefits received as part of a work agreement but not included as salary or wage; also called fringe benefits

Company Car
Company provided car

Car Allowance
Use of personal car

Commuter
Parking and transportation

Relocation
Transferred location assistance

Corporate Gift
Gifted rewards

Corporate Appearance
Attire and grooming

Meals
Free or discounted

SubMarket Purchase
ER afforded savings

Wellness
Health and fitness

Education
Learning and tuition

Travel
Business travel

Company Assets
Use of assets

Group-Sponsored Insurance
Health insurance coverage obtained through membership in a group, e.g. employer or group affinity

Health
Includes coverage types of medical, dental, vision, and prescription drug

Life
Includes GTL, Whole, Universal, AD&D and Variable

FROM FIG. 6A

Equity Pay
Shares in lieu of cash

Retention Bonus
Used to provide continuity

Performance Stock Units
Performance-based vesting

Profit Share Pay
Based on company performance

Sign-On Bonus
Used to sign new employees

FROM FIG. 6A

Commission Pay
Generally related to sales

Severance Pay
Paid upon voluntary termination in some cases

Standby Pay
Compensation for on-call or waiting hours

Additional Duty Pay
Compensation for additional responsibilities

Acting Up Pay
Compensation for temporary increase in responsibilities

Gratuity Pay
Compensation based on cash or charged tips

Commodity Pay
Non-Cash compensation

Guaranteed Pay
A mandated payment, sometimes called a bonus, that is really just an altered distribution of regular pay

PTO Pay
Related to a PTO Plan such that time off hours substitute for worked hours

FIG. 6C

Personal Leave
Time off for non-descript reason

Community Service Leave
Time off to engage in designated community activities

Paternal Leave
Time off to a mother before/after birth/adoption of child

Maternity Leave
Time off to a mother before/after birth/adoption of child

Paternity Leave
Time off to a father before/after birth/adoption of child

Family Leave
Time off to care for family member

Sick Leave
Authorized time off due to illness

Uniform
Company representative attire

Pers. Protective Equipment
Special safety gear

Electronic Communication
E.g. phone and email

Professional Services
E.g. legal or financial advisors

Housing
Housing support

Donations

Membership
Fees and dues

Company Loans

Disability
Includes SDI and LDI

Personal Accident
Includes hospital benefits, funeral expenses, accidental death

Critical Illness
Lump sum payments to cover expenses related to a qualifying illness

Social Insurance
Government sponsored insurance obtained through employment, localized based on country or geographic region

Deferred Compensation
Arrangement in which income is withheld and paid at a later date such that taxes are deferred until payment

Retirement Saving Account
Defined contribution savings plan for retirement

Pension Plan
Defined benefit savings plan for retirement

Employee Stock Ownership Plan
Plan based on investing in stock of the sponsoring employer

College Savings Plan
Savings plan for college payments

FIG. 6D

EARNING CODE CLASSIFICATION

CROSS-REFERENCE TO RELATED APPLICATIONS

This application claims priority and benefit under 35 U.S.C. § 120 as a continuation of U.S. Ser. No. 16/358,220, filed Mar. 19, 2019, the contents of which are is hereby incorporated by reference herein in its entirety.

BACKGROUND INFORMATION

1. Field

The present disclosure relates generally to an improved computer system and, in particular, to classifying and applying human resources data.

2. Background

Earning codes are very important in human capital management (HCM), especially for payroll transaction. Such codes typically denote the nature of compensation to employees and the circumstances giving rise to the compensation such as regular pay, overtime, sale commission, retirement, etc.

In addition to the nature of the compensation itself, payroll transactions can also be related to other human resources (HR) related parameters such as job category, position within an organization, tenure, etc.

Businesses generate large amounts of such payroll data, the data is typically not normalized and used to evaluate and refined business operations.

SUMMARY

An illustrative embodiment provides a computer-implemented method for classifying and applying human resources data. The method comprises aggregating employee transaction data for an organization and evaluating a number of human resources-related attributes across heterogeneous transaction data. The employee transaction data is classified via statistical machine learning into a number of normalized codes according to the human resources-related attributes, a user interface is presented to adjust a number of organizational operating procedures according to the normalized codes.

Another illustrative embodiment provides a system for classifying and applying human resources data. The system comprises a bus system, a storage device connected to the bus system, wherein the storage device stores program instructions, and a number of processors connected to the bus system, wherein the number of processors execute the program instructions to: aggregate employee transaction data for an organization; evaluate a number of human resources-related attributes across heterogeneous transaction data; classify, via statistical machine learning, the employee transaction data into a number of normalized codes according to the human resources-related attributes; and present a user interface to adjust a number of organizational operating procedures according to the normalized codes.

Another illustrative embodiment provides a computer program product for classifying and applying human resources data. The computer program product comprises a non-volatile computer readable storage medium having program instructions embodied therewith, the program instructions executable by a number of processors to cause the computer to perform the steps of: aggregating employee transaction data for an organization; evaluating a number of human resources-related attributes across heterogeneous transaction data; classifying, via statistical machine learning, the employee transaction data into a number of normalized codes according to the human resources-related attributes; and presenting a user interface to adjust a number of organizational operating procedures according to the normalized codes.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 6A-6D illustrate categorical outputs of earning code classification in accordance with illustrative embodiments;

DETAILED DESCRIPTION

The illustrative embodiments recognize and take into account one or more different considerations. For example, the illustrative embodiments recognize and take into account that earning codes are very important to human capital management but that due to the nature of data generation and business operations, those earning codes are not cleaned and normalized with many variations.

Illustrative embodiments also recognize and take into account that though each single earning amount might be arbitrary, if the information is compressed per earning code, it provides a systematic view of pay patterns. From this, certain groups of features can be derived based on aggregation across all the earnings of each original earning code of a particular organization.

Illustrative embodiments provide a method to classify and normalize earning codes based on payroll information by using machine learning, which allows downstream applications such as resource allocation in terms of earning codes, benchmarking results over detailed earning types, analytical reporting with respect to payroll, and payroll setup recommendations.

Figure 1:
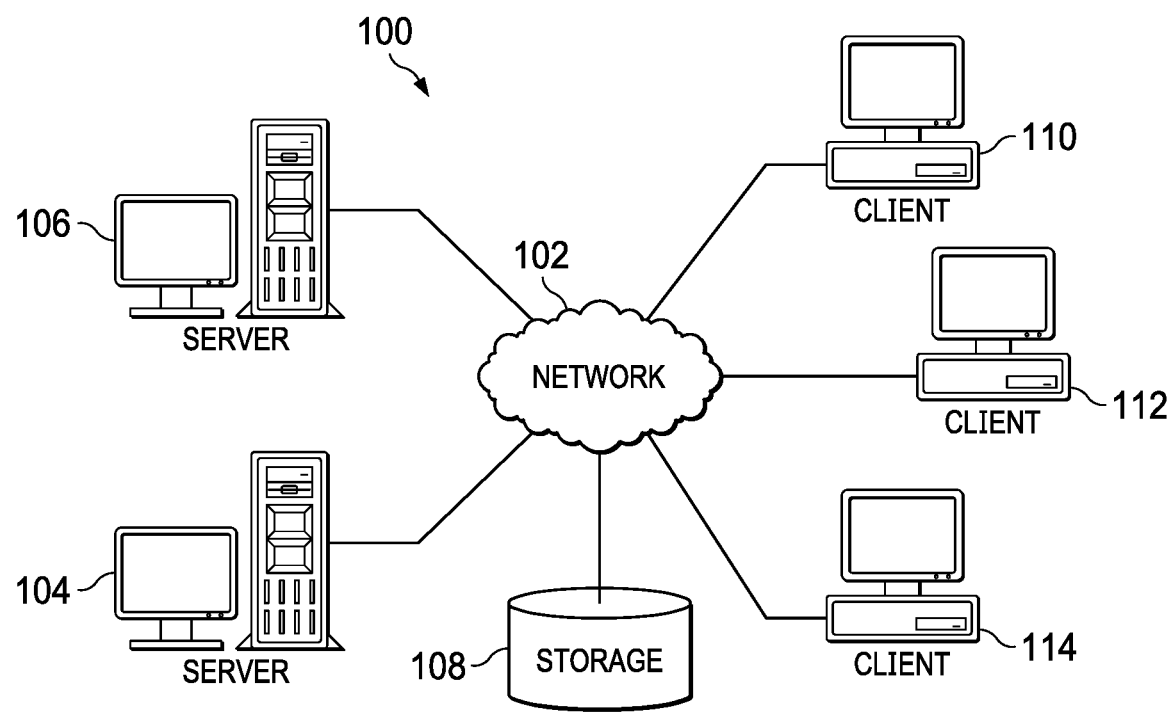
FIG. 1 is an illustration of a block diagram of an information environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
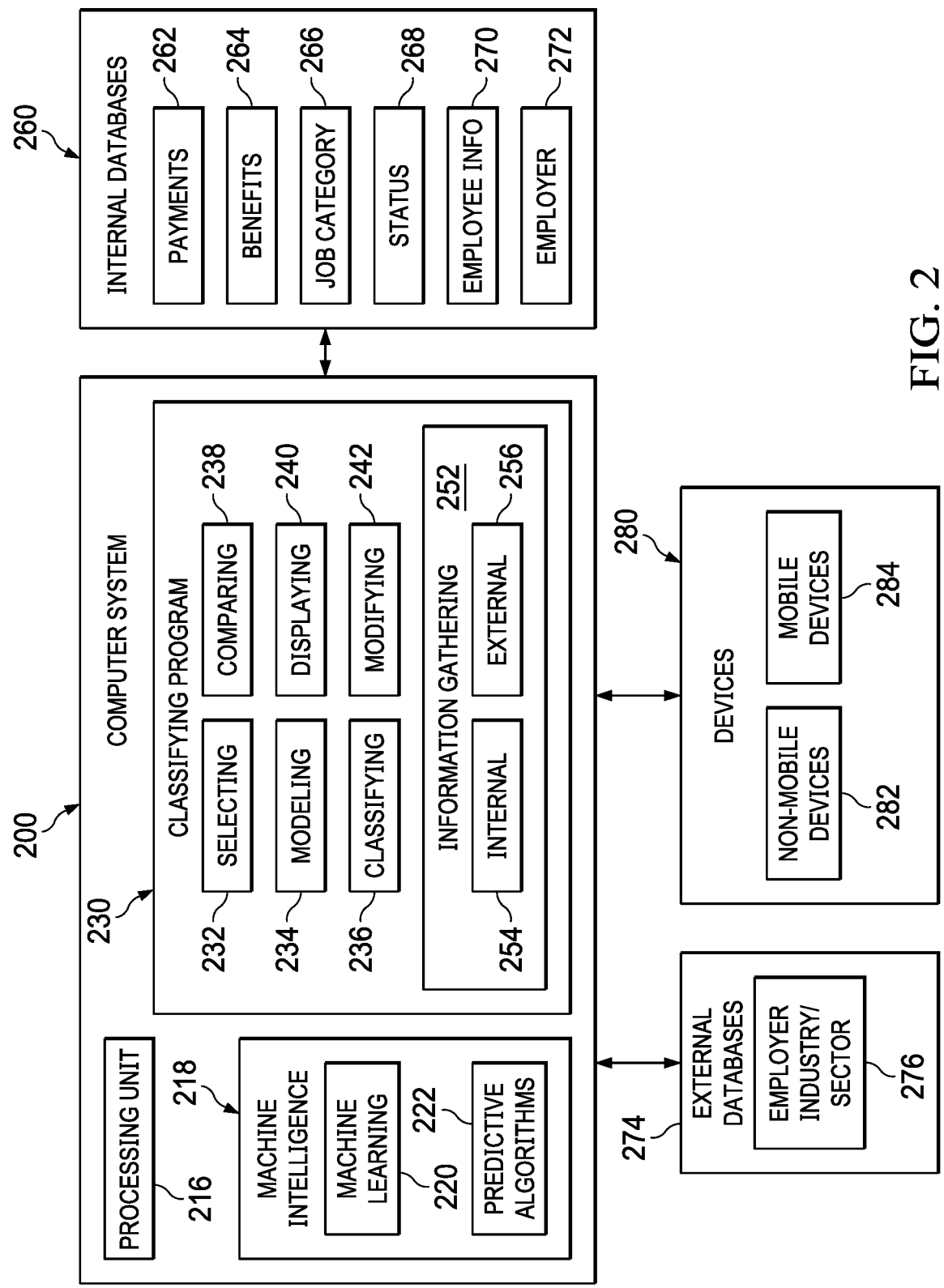
FIG. 2 is an illustration of a block diagram of a computer system for predictive modeling in accordance with an illustrative embodiment.

Turning to FIG. 2, a block diagram of a computer system for predictive modeling is depicted in accordance with an illustrative embodiment. Computer system 200 is connected to internal databases 260, external databases 274 and devices 280. Internal databases 260 comprise HR data such as payments 262, benefits 264, job category 266, employee status 268 (i.e. salaried versus hourly), employee information 720 (e.g., age, tenured, etc.), and employer information 272. External databases 274 comprise employer industry/sector 276, which can be used for benchmarking. Devices 280 comprise non-mobile devices 282 and mobile devices 284.

Computer system 200 comprises information processing unit 216, machine intelligence 218, and classifying program 230.

Machine intelligence 218 comprises machine learning 220 and predictive algorithms 222.

Machine intelligence 218 can be implemented using one or more systems such as an artificial intelligence system, a neural network, a Bayesian network, an expert system, a fuzzy logic system, a genetic algorithm, or other suitable types of systems. Machine learning 220 and predictive algorithms 222 may make computer system 200 a special purpose computer for dynamic predictive modelling of the probability of financial stress.

In an embodiment, processing unit 216 comprises one or more conventional general purpose central processing units (CPUs). In an alternate embodiment, processing unit 216 comprises one or more graphical processing units (GPUS). Though originally designed to accelerate the creation of images with millions of pixels whose frames need to be continually recalculated to display output in less than a second, GPUs are particularly well suited to machine learning. Their specialized parallel processing architecture allows them to perform many more floating point operations per second then a CPU, on the order of 100× more. GPUs can be clustered together to run neural networks comprising hundreds of millions of connection nodes.

Classifying program 230 comprises information gathering 252, selecting 232, modeling 234, classifying 236, comparing 238, displaying 240, and modifying 242. Information gathering 252 comprises internal 254 and external 256. Internal 254 is configured to gather data from internal databases 260. External 256 is configured to gather data from external databases 274.

Thus, processing unit 216, machine intelligence 218, and classifying program 230 transform a computer system into a special purpose computer system as compared to currently available general computer systems that do not have a means to perform machine learning predictive modeling such as computer system 200 of FIG. 2. Currently used general computer systems do not have a means to accurately predict and compare the probability of financial stress without pulling credit bureau data.

There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from feedback to re-learn/retrain the models. Algorithms are used to train the predictive model through interacting with the environment using measurable performance criteria.

Figure 3:
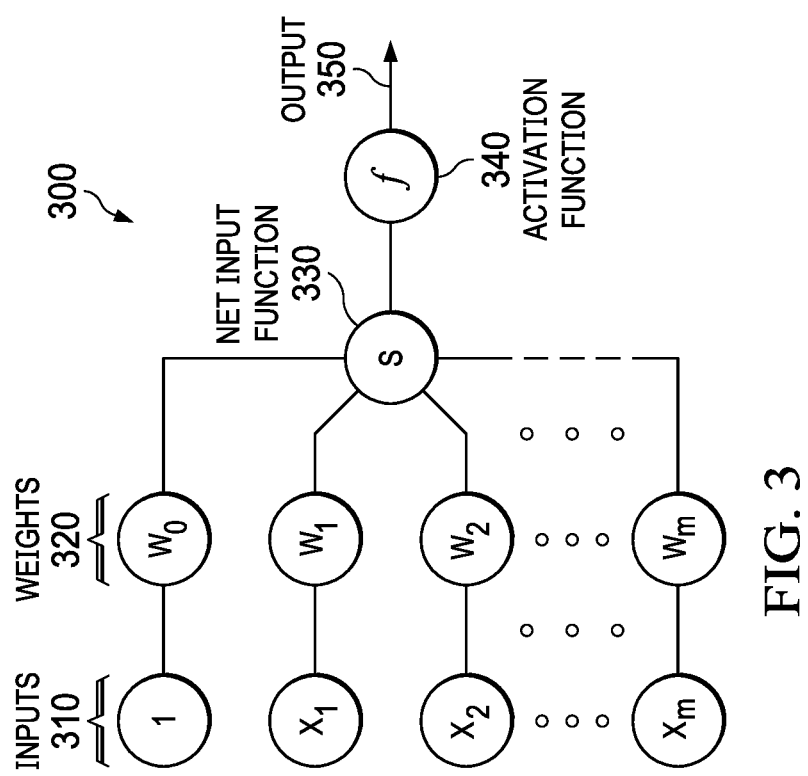
FIG. 3 is a diagram that illustrates a node in a neural network in which illustrative embodiments can be implemented.

FIG. 3 is a diagram that illustrates a node in a neural network in which illustrative embodiments can be implemented. Node 300 combines multiple inputs 310 from other nodes. Each input 310 is multiplied by a respective weight 320 that either amplifies or dampens that input, thereby assigning significance to each input for the task the algorithm is trying to learn. The weighted inputs are collected by a net input function 330 and then passed through an activation function 340 to determine the output 350. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Stochastic neural networks are a type of network that incorporate random variables, which makes them well suited for optimization problems. This is done by giving the nodes in the network stochastic (randomly determined) weights or transfer functions. A Boltzmann machine is a type of stochastic neural network in which each node is binary valued, and the chance of it firing depends on the other nodes in the network. Each node is a locus of computation that processes an input and begins by making stochastic decisions about whether to transmit that input or not. The weights (coefficients) that modify inputs are randomly initialized.

It should be emphasized that using neural network-based algorithms is merely an example of one implementation of the illustrative embodiments. Illustrative embodiments can also employ other algorithms such as Random Forest, Gradient-based Machine, XGBoost, etc.

In machine learning, a cost function estimates how the model is performing. It is a measure of how wrong the model is in terms of its ability to estimate the relationship between input x and output y. This is expressed as a difference or distance between the predicted value and the actual value. The cost function (i.e. loss or error) can be estimated by iteratively running the model to compare estimated predictions against known values of y during supervised learning. The objective of a machine learning model, therefore, is to find parameters, weights, or a structure that minimizes the cost function.

Gradient descent is an optimization algorithm that attempts to find a local or global minima of a function, thereby enabling the model to learn the gradient or direction that the model should take in order to reduce errors. As the model iterates, it gradually converges towards a minimum where further tweaks to the parameters produce little or zero changes in the loss. At this point the model has optimized the weights such that they minimize the cost function.

Neural networks can be stacked to created deep networks. After training one neural net, the activities of its hidden nodes can be used as training data for a higher level, thereby allowing stacking of neural networks. Such stacking makes it possible to efficiently train several layers of hidden nodes. Examples of stacked networks include deep belief networks (DBN), deep Boltzmann machines (DBM), convolutional neural networks (CNN), recurrent neural networks (RNN), and spiking neural networks (SNN).

Figure 4:
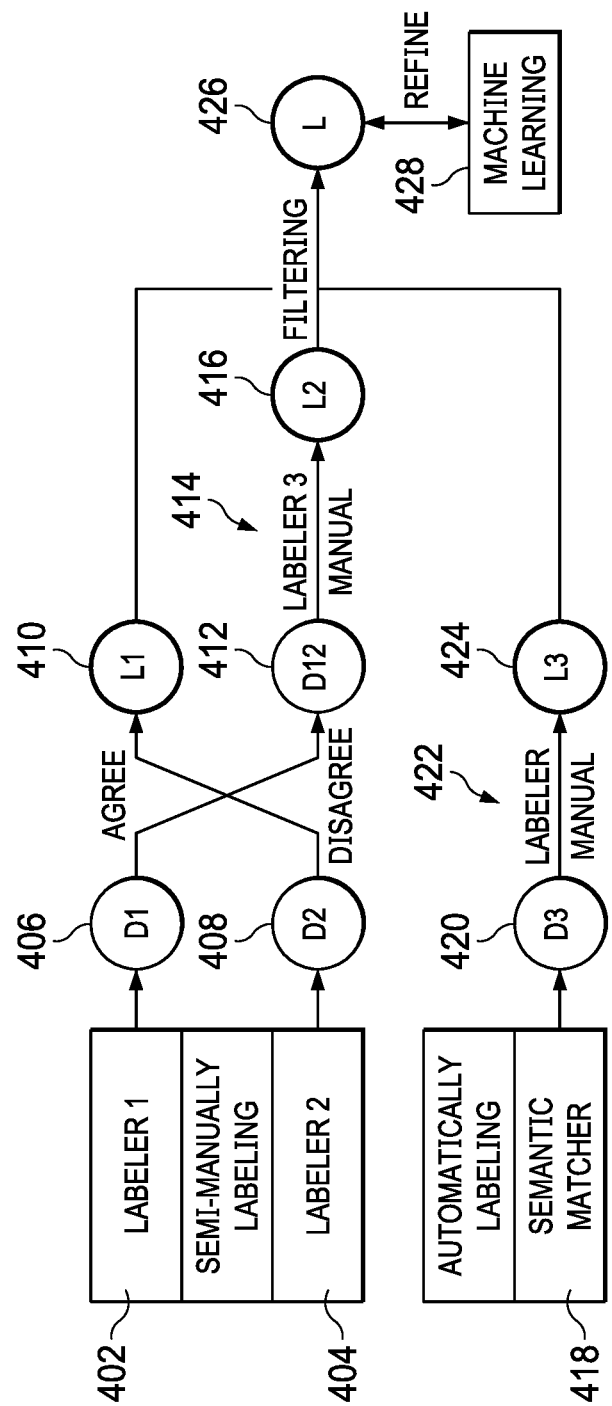
FIG. 4 illustrates a process flow for labeled dataset construction in accordance with an illustrative embodiment.

FIG. 4 illustrates a process flow for labeled dataset construction in accordance with an illustrative embodiment. Sufficient labeled data of good quality is critical for supervised machine learning. The sources from which payroll transaction data is derived contains certain information such as earning code descriptions, which is highly indicative in terms of normalized earning types. Those descriptions are used as seed information to build a labeled dataset. FIG. 4 is an example of supervised machine learning.

The process begins with two independent labelers 402 and 404 conducting semi-manual labelling in accordance with expert payroll categories. In this process, automated matching is used to process the initial pool (which is too large for a human to sift) to find likely candidates, which are then manually verified. Such a heuristic matching process has high precision. Each labeler 402, 404 produces an independent preliminary dataset D1 406 and D2 408, respectively, which are compared with each other.

Data points that are in agreement between D1 402 and D2 406 are added to a first labeled dataset L1 410. Discrepancies between the labelers 402, 404 are added to a third preliminary dataset D3 412, which is then resolved by a third independent labeler 414 to produce a second labeled dataset L2 416.

An unsupervised semantic matcher 418 produces a third preliminary dataset D3 420, which is verified by a labeler 422 to create a third labeled dataset L3 424.

A final labeled dataset L 426 is generated by combining L1, L2, and L3 by applying quality control to the labeled dataset to remove outliers. This final labeled dataset 426 provides sufficient labeled sample for training and evaluating classifiers during machine learning 428, explained below.

Figures 5, 8:
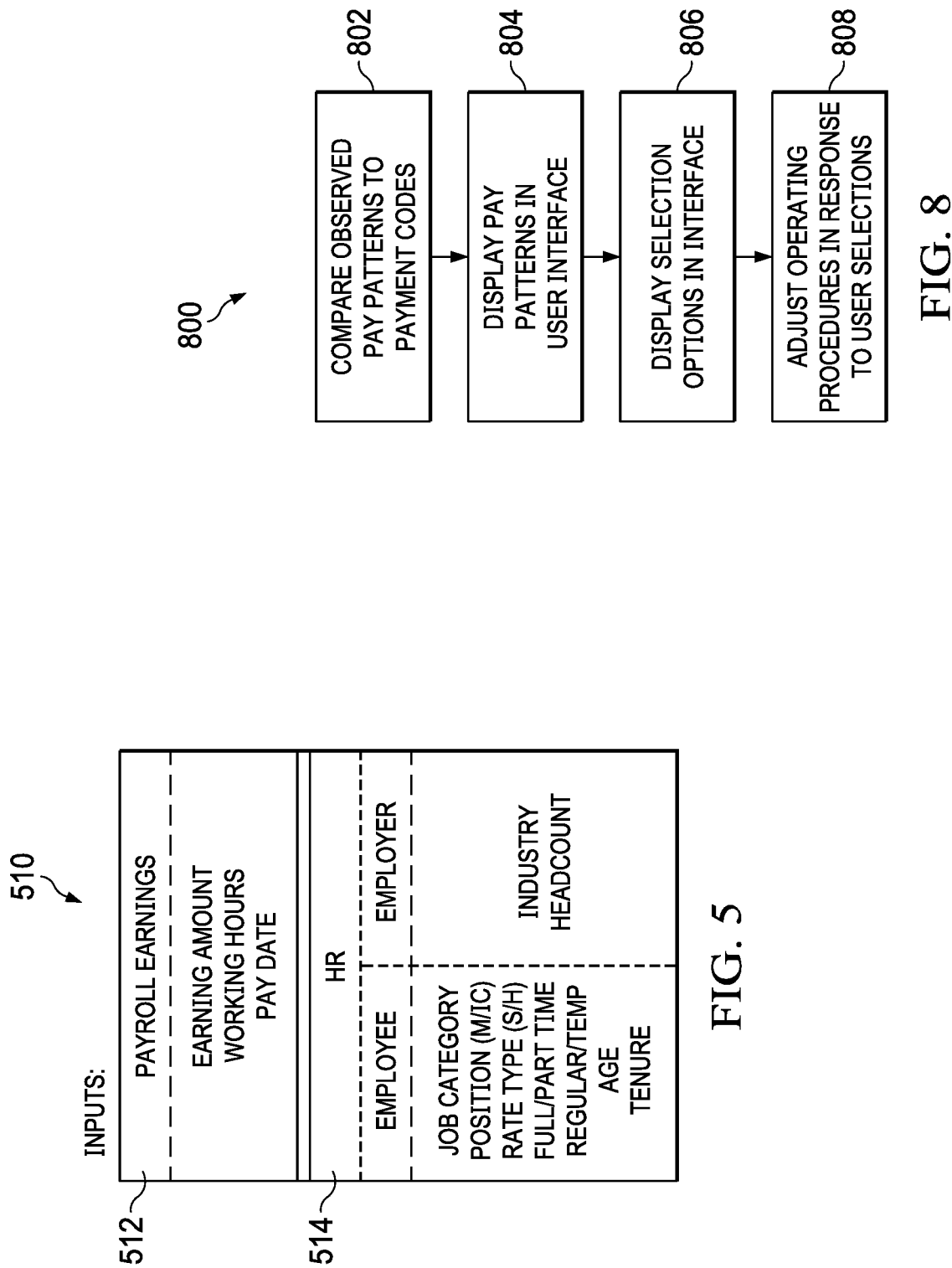
FIG. 5 illustrates categorical inputs for earning code classification in accordance with illustrative embodiments.
FIG. 8 illustrates a process flow for applying earning code data in accordance with an illustrative embodiment.

FIG. 5 illustrates categorical inputs for earning code classification in accordance with illustrative embodiments. The inputs 510 include information about payments made to employees and the conditions under which those payments are made. In the present example, payroll earnings data 512 includes earning amount, working hours, and pay date. In addition, HR attributes 514 are includes which include employee information such as job category, position, rate type (salary/hourly), full or part time status, age, and tenure. HR attributes 514 can also include information about the employer such as industry and employee headcount (size).

FIGS. 6A-6D illustrate categorical outputs of earning code classification in accordance with illustrative embodiments.

When employee payroll transaction data is evaluated in terms of the HR attributes, the resulting output 620 classifies the payroll data into normalized earning codes. In the illustrated example, payroll data is classified into 19 earning codes. However, fewer or greater numbers of codes can be used.

A few examples of earning codes include: regular pay associated with regular salary or regular hours worked, overtime pay, paid time off (PTO) such as vacations and sick leave, standby pay associated with inactive periods such as on-call duties, sales commissions, equity, perquisites such as transportation and housing allowances, and retirement.

Figure 7:
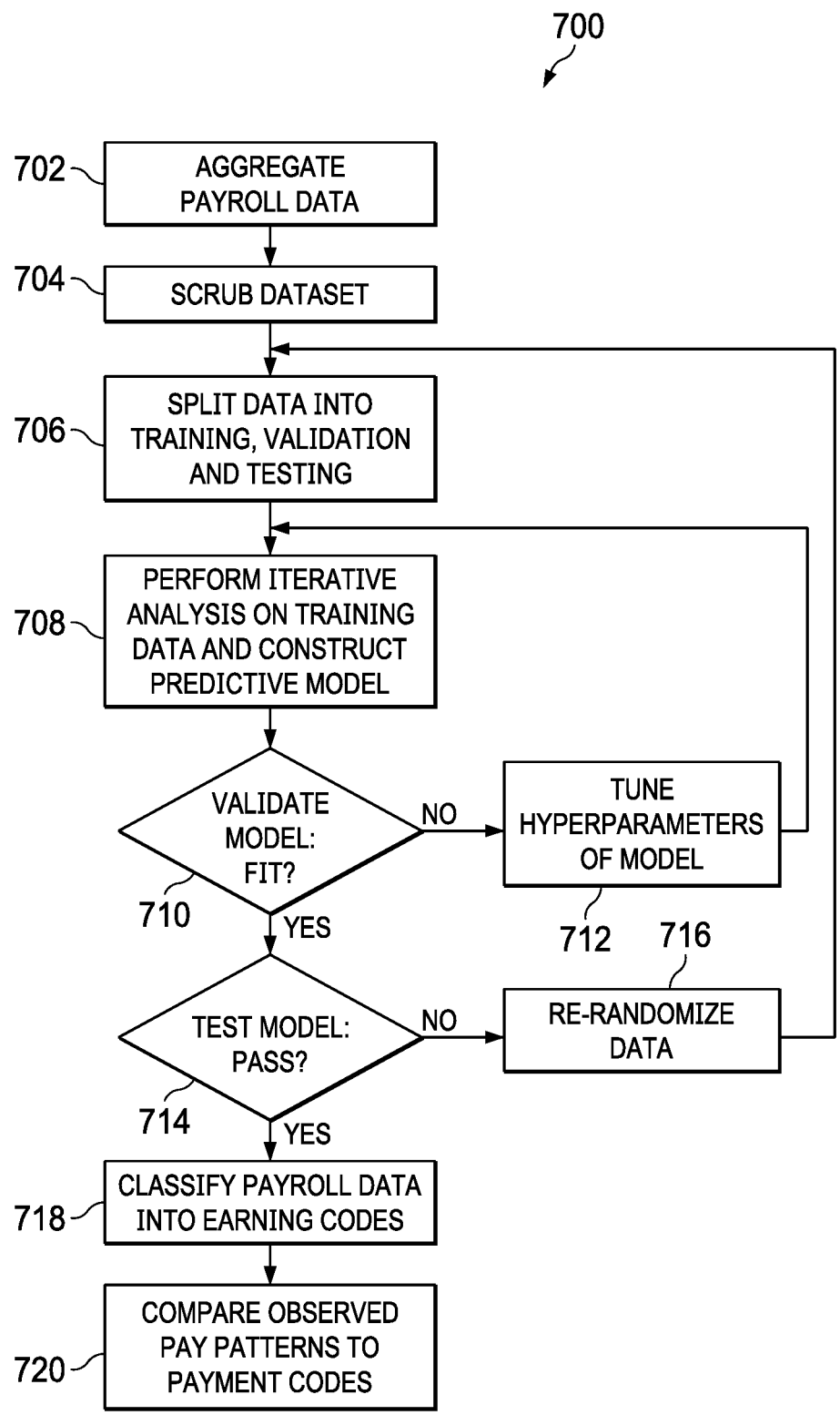
FIG. 7 is a flowchart for a process of predictive modeling and classification of earning codes in accordance with an illustrative embodiment.

Turning to FIG. 7, a flowchart for a process of predictive modeling and classification of earning codes is depicted in accordance with an illustrative embodiment. Process 700 can be implemented in software, hardware, or a combination of the two.

Process 700 begins by aggregating employee payroll and other transaction data (step 702). After the dataset is aggregated, process 700 scrubs and labels the dataset (step 704). Very large datasets, sometimes referred to as Big Data, often contain noise and complicated data structures. Bordering on the order of petabytes, such datasets comprise a variety, volume, and velocity (rate of change) that defies conventional processing and is impossible for a human to process without advanced machine assistance. Scrubbing refers to the process of refining the dataset before using it to build a predictive model and includes modifying and/or removing incomplete data or data with little predictive value. The dataset can be scrubbed and labeled using the process depicted in FIG. 5.

After the dataset has been scrubbed and labeled, process 700 divides the data into training, validation, and test datasets to be used for building and testing the predictive model (step 706). To produce optimal results, the same data that is used to test the model should not be the same data used for training. The data is divided with 80% used for training, 10% used for validation, and 10% used for testing. Randomizing the selection of the datasets avoids bias in the model.

Process 700 then performs iterative analysis on the training date by applying predictive algorithms to construct a predictive model (step 708). Examples of algorithms that can be used include Naïve Bayes (NB), Logistic Regression (LR), Fully Connected Neural-Network-based model (NN), and tree-based models such as Distributed Random Forest (DRF), Gradient Boosting Machine (GBM), and XG Boost (XGB). XGB in particular has the advantage of using regularization terms to penalize overfitting and adopts the second-order optimization algorithm.

As the model is being constructed, it is periodically validated using the validation dataset (step 710). This provides an unbiased evaluation of a model fit on the training dataset. The validation dataset can also play a role in other area of model construction such as feature selection.

If the model does not adequately fit the training dataset, the process tunes the hyperparameters of the model (step 712). Hyperparameters are the settings of the algorithm that control how fast the model learns patterns and which patterns to identify and analyze.

After the model is constructed, the test data is fed into model to test its accuracy (step 714). In an embodiment the model is tested using mean absolute error, which examines each prediction in the model and provides an average error score for each prediction. If the error rate between the training and test dataset is below a predetermined threshold, the model has learned the dataset's pattern and passed the test.

If the model fails the test the training, validation, and test data are re-randomized, and the iterative analysis of the training data is repeated (step 716). Once a model has passed the test stage it is ready for application.

Whereas supervised and unsupervised learning reach an endpoint after a predictive model is constructed and passes the test in step 714, reinforcement learning continuously improves its model using feedback from application to new empirical data. Algorithms such as Q-learning are used to train the predictive model through continuous learning using measurable performance criteria (discussed in more detail below).

After the model is constructed and tested for accuracy, process 700 uses the model to classify the payroll data into normalized earning codes (step 718).

After the data has been classified, process 700 compares observed pay patterns to the earning codes (step 720).

FIG. 8 illustrates a process flow for applying earning code data in accordance with an illustrative embodiment. Process 800 begins by comparing pay patterns to payment codes (step 802). The different pay patterns are displayed on a user interface (step 804). Examples of displays of pay patterns versus earning are shown in FIGS. 9-14.

The interface also displays selection options regarding organization procedures that are related to the pay patterns in question (step 806). Examples of such procedures include payroll set up options, allocation of resources, work schedules, the ratio of salaried versus hourly employees assigned to a task, perquisite budgets, etc. In response to input of user selections, the HR system will adjust the operating procedures of the company (step 808).

Figure 9:
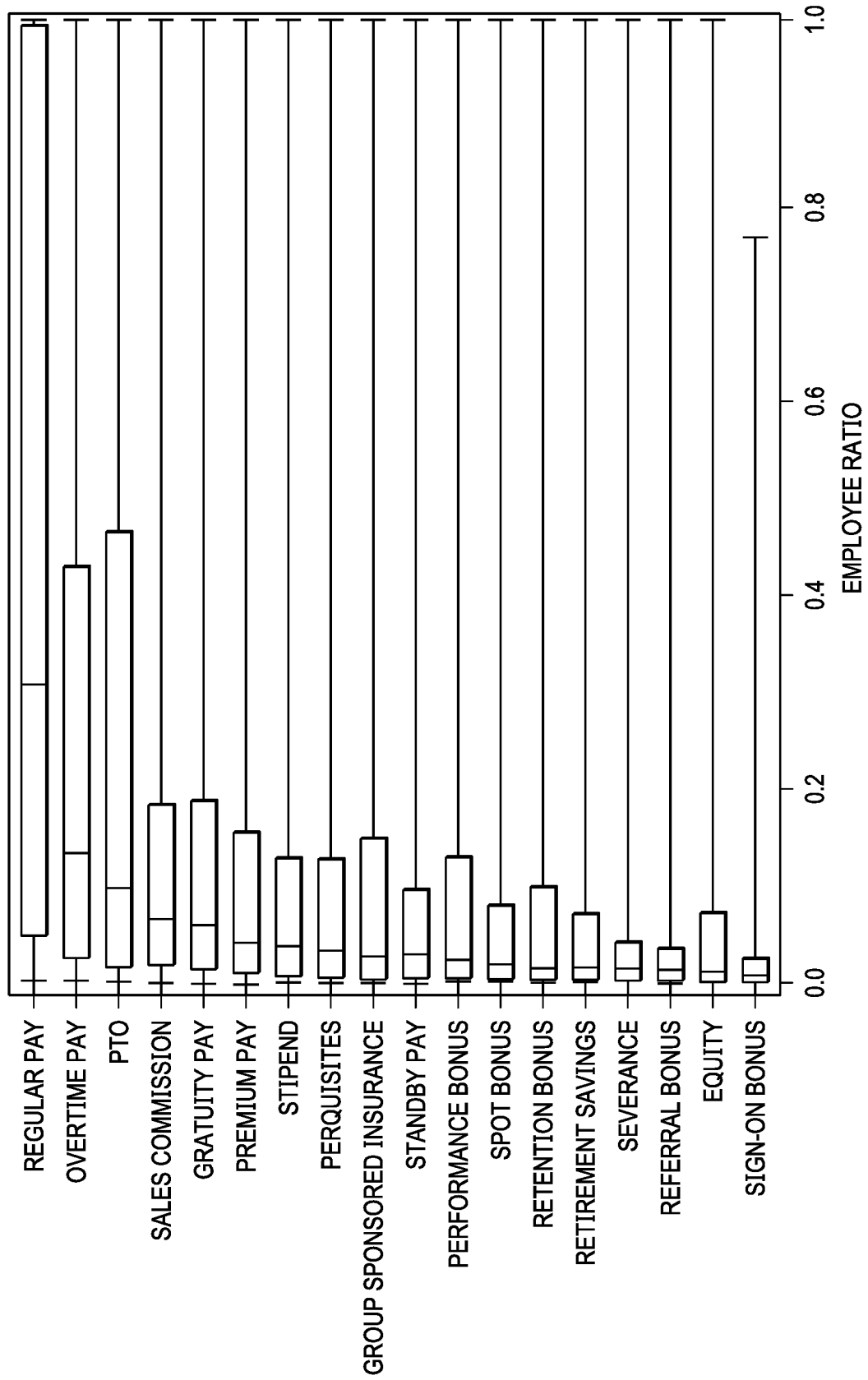
FIG. 9 depicts a graphical comparison of employee ratio versus earning code in accordance with an illustrative embodiment.

FIG. 9 depicts a graphical comparison of employee ratio versus earning code in accordance with an illustrative embodiment. Employee ratio is a very strong indicator to differentiate special payments (e.g., severance, equity) from more common payments (e.g., regular pay, PTO). The employee ratio is calculated as the percentage of employees with that particular earning code over all of the employees in the organization. Intuitively, payments like regular pay or overtime pay could be much more popular than other payments like equity or severance.

Figure 10:
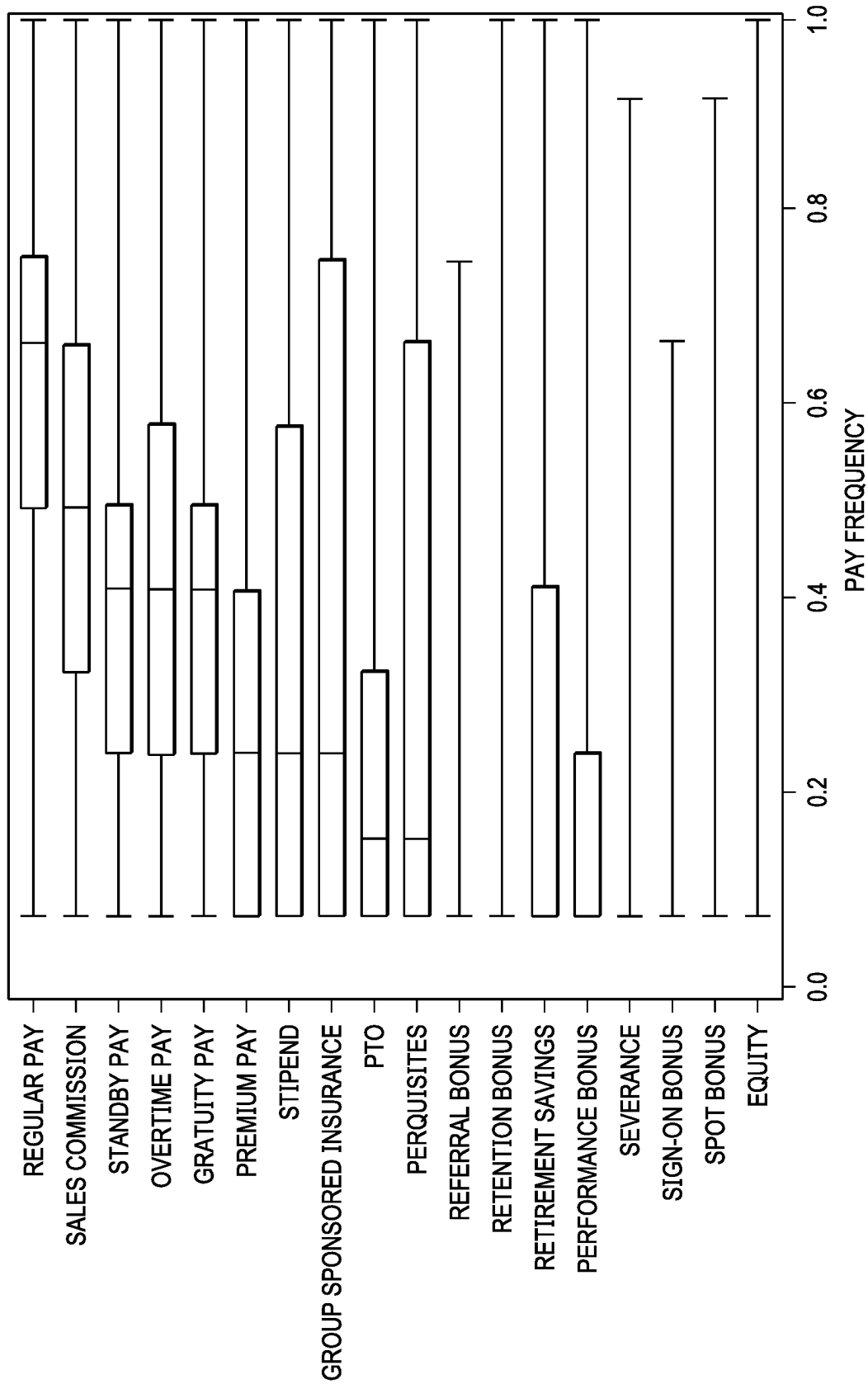
FIG. 10 depicts a graphical comparison of pay frequency versus earning code in accordance with an illustrative embodiment.

FIG. 10 depicts a graphical comparison of pay frequency versus earning code in accordance with an illustrative embodiment. Pay frequency estimates how frequently each earning code will appear in a 12-month payroll history. For example, regular pay might appear very frequently on each paycheck, while performance bonus like an annual bonus might only appear once a year.

Figure 11:
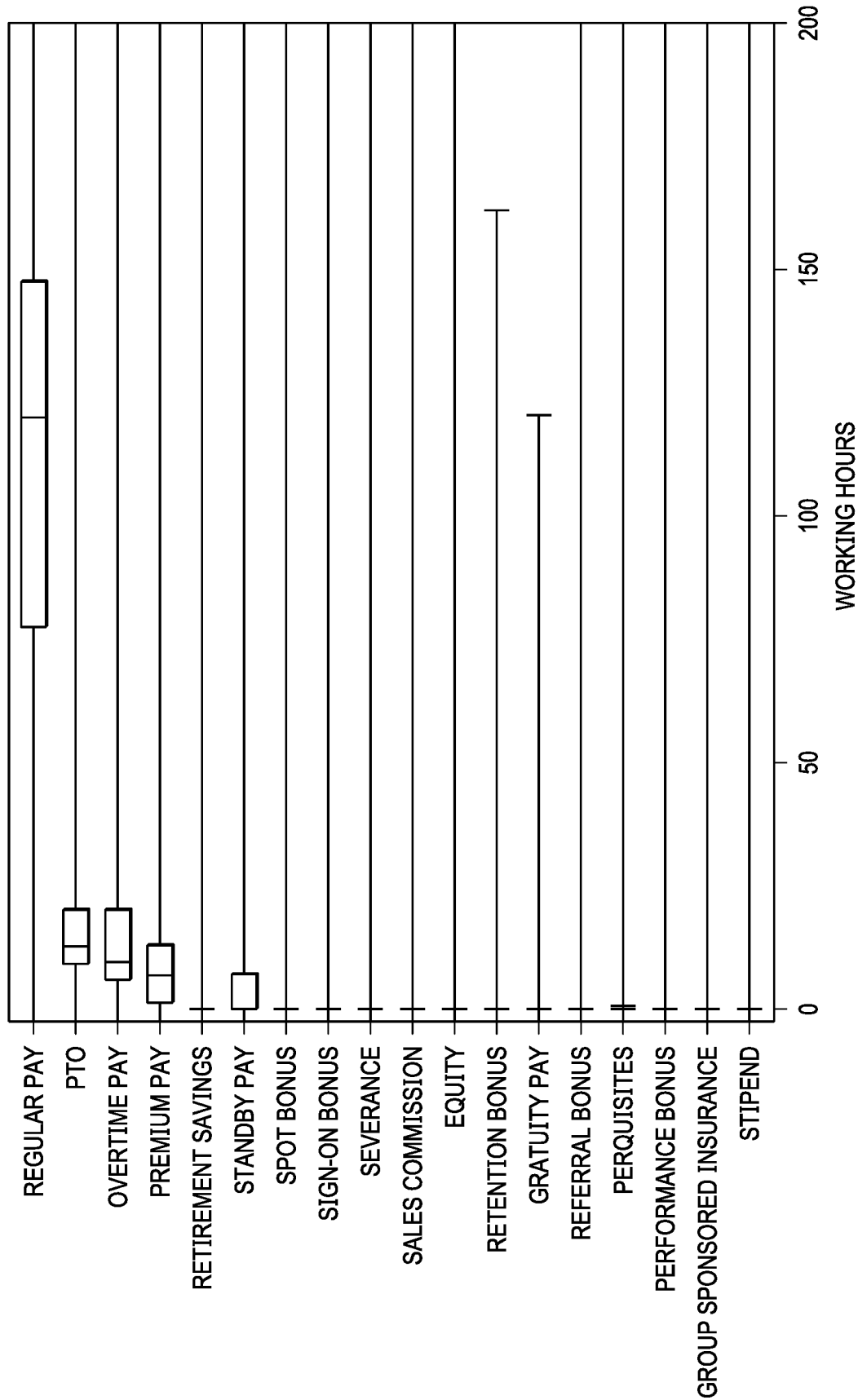
FIG. 11 depicts a graphical comparison of working hours versus earning code in accordance with an illustrative embodiment.

FIG. 11 depicts a graphical comparison of working hours versus earning code in accordance with an illustrative embodiment. This graph illustrates that payments like regular ray and PTO are estimated based on hours worked while most other types of payments are not associated with working hours such as performance bonuses or stipends.

Figure 12:
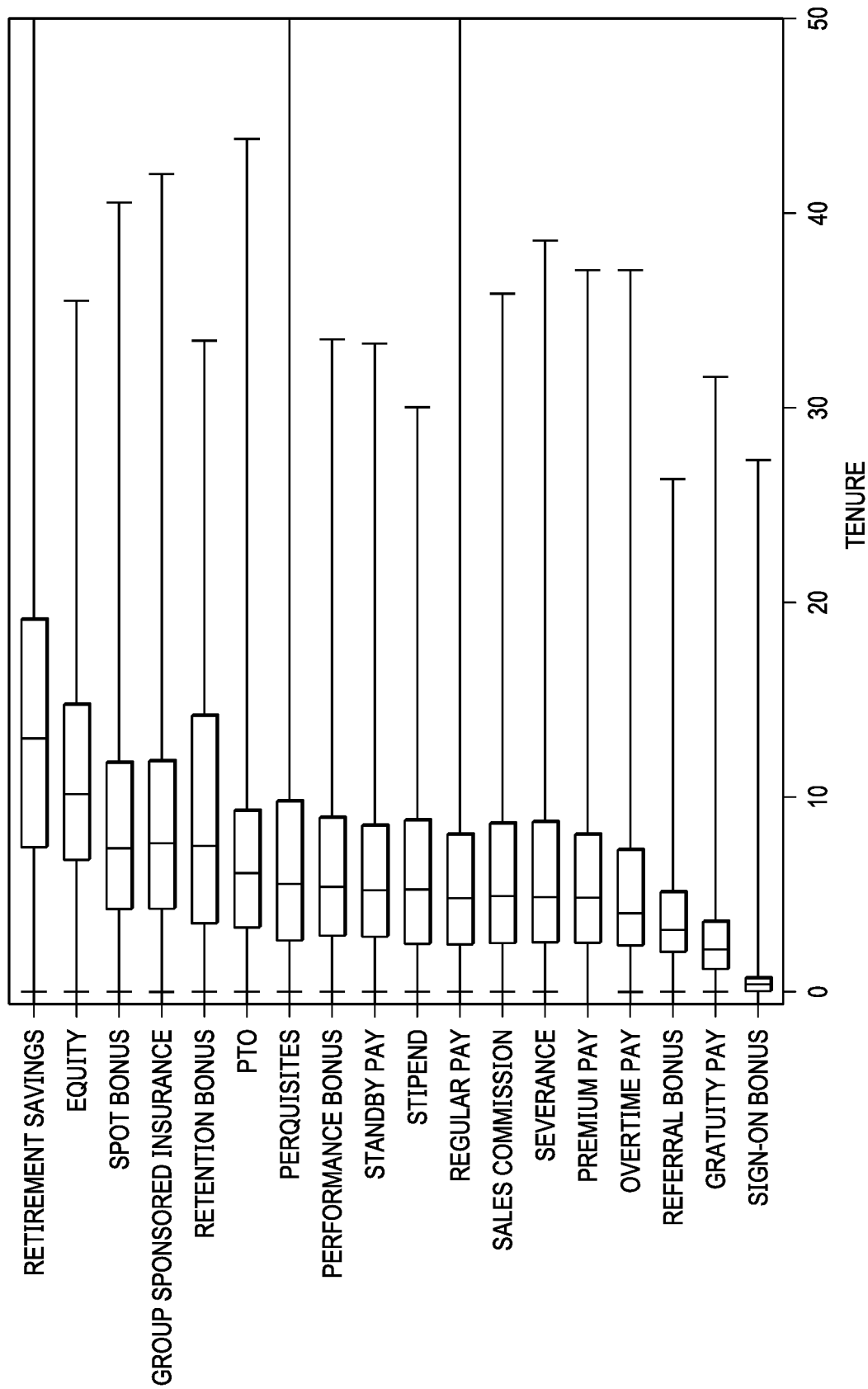
FIG. 12 depicts a graphical comparison of tenure versus earning code in accordance with an illustrative embodiment.

FIG. 12 depicts a graphical comparison of tenure versus earning code in accordance with an illustrative embodiment. Seniority can also help to differentiate certain types of earning codes. Using tenure as an example, the value is much smaller for sign-on bonus compared to other types, whereas retention bonuses and retirement savings increase with increasing tenure.

Figure 13:
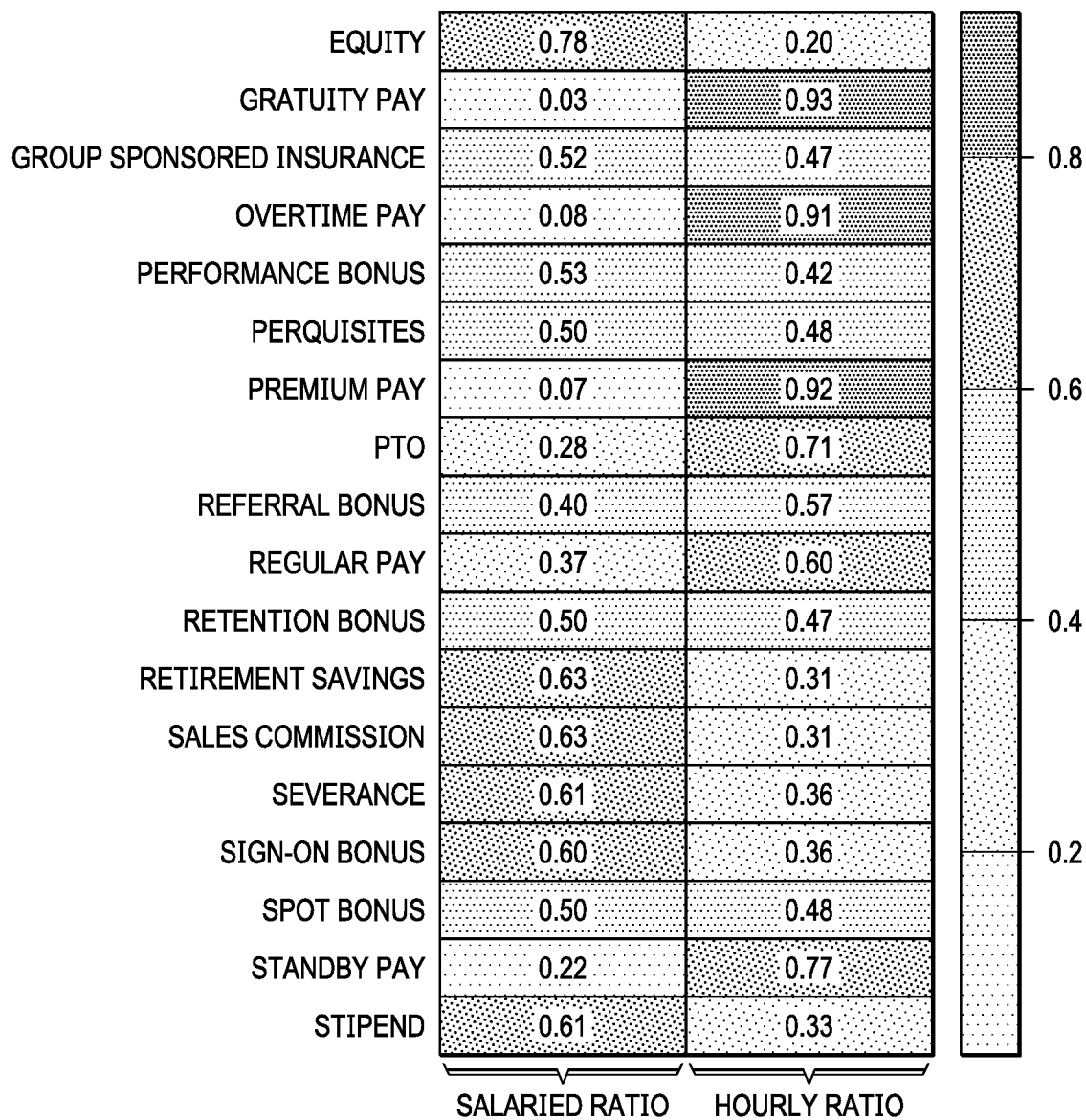
FIG. 13 depicts a graphical comparison of employee status versus earning code in accordance with an illustrative embodiment.

FIG. 13 depicts a graphical comparison of employee status versus earning code in accordance with an illustrative embodiment. In this example, only the differences between salaried employees and hourly employees are shown in terms of employee status. However, this model uses much more information than that. For example, factors such fulltime/part-time, managerial/individual-contributor indicator, etc. are also taken into account.

Figure 14:
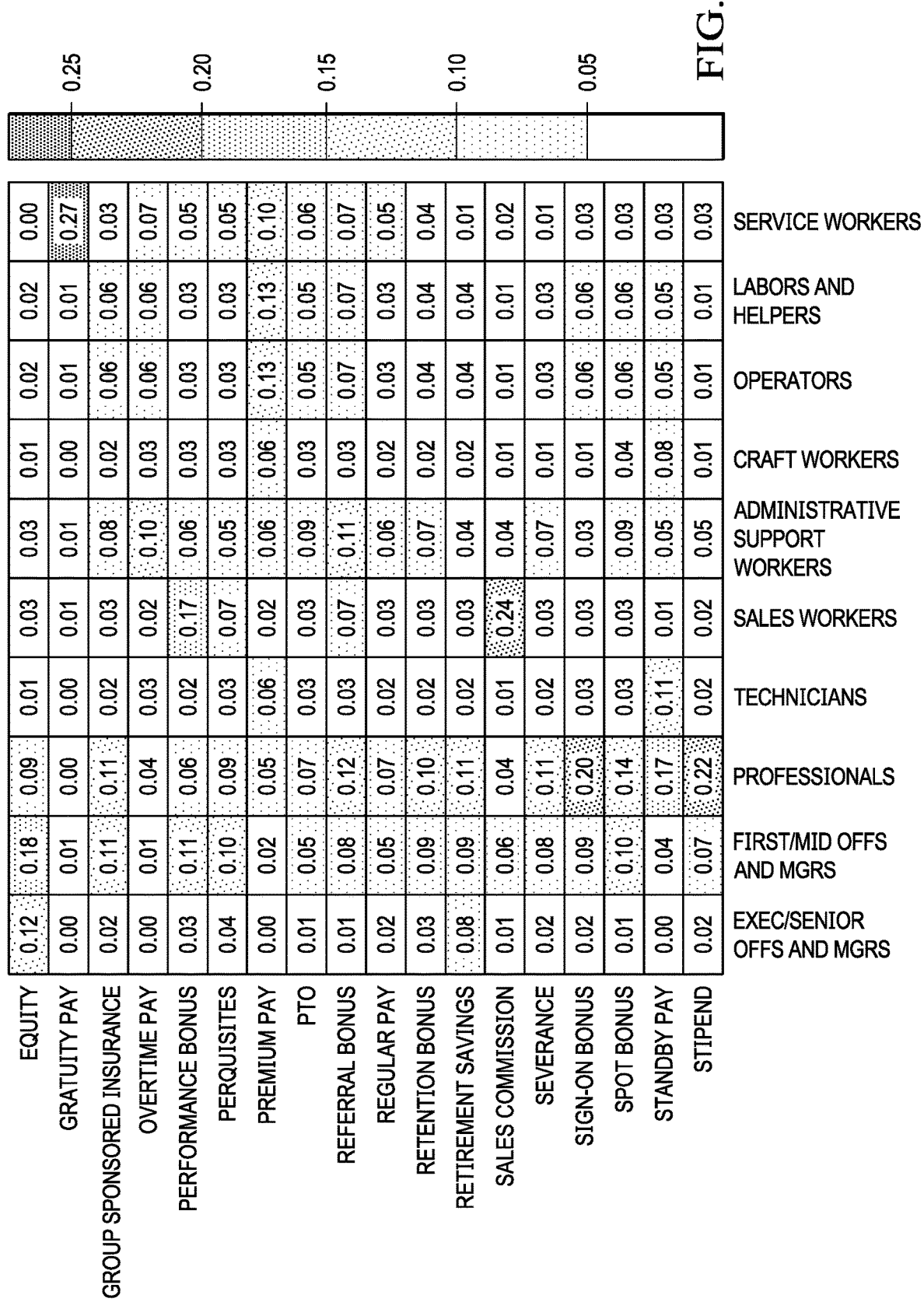
FIG. 14 depicts a graphical comparison of job category versus earning code in accordance with an illustrative embodiment.

FIG. 14 depicts a graphical comparison of job category versus earning code in accordance with an illustrative embodiment. As can be seen, employees with different job characteristics are clearly associated with different pay patterns. For example, there are more equity payments for salaried employees and more gratuity payments for the hourly employees. Similarly, there are more sales commission payments for the sales workers and more tips payments for the service workers.

Figure 15:
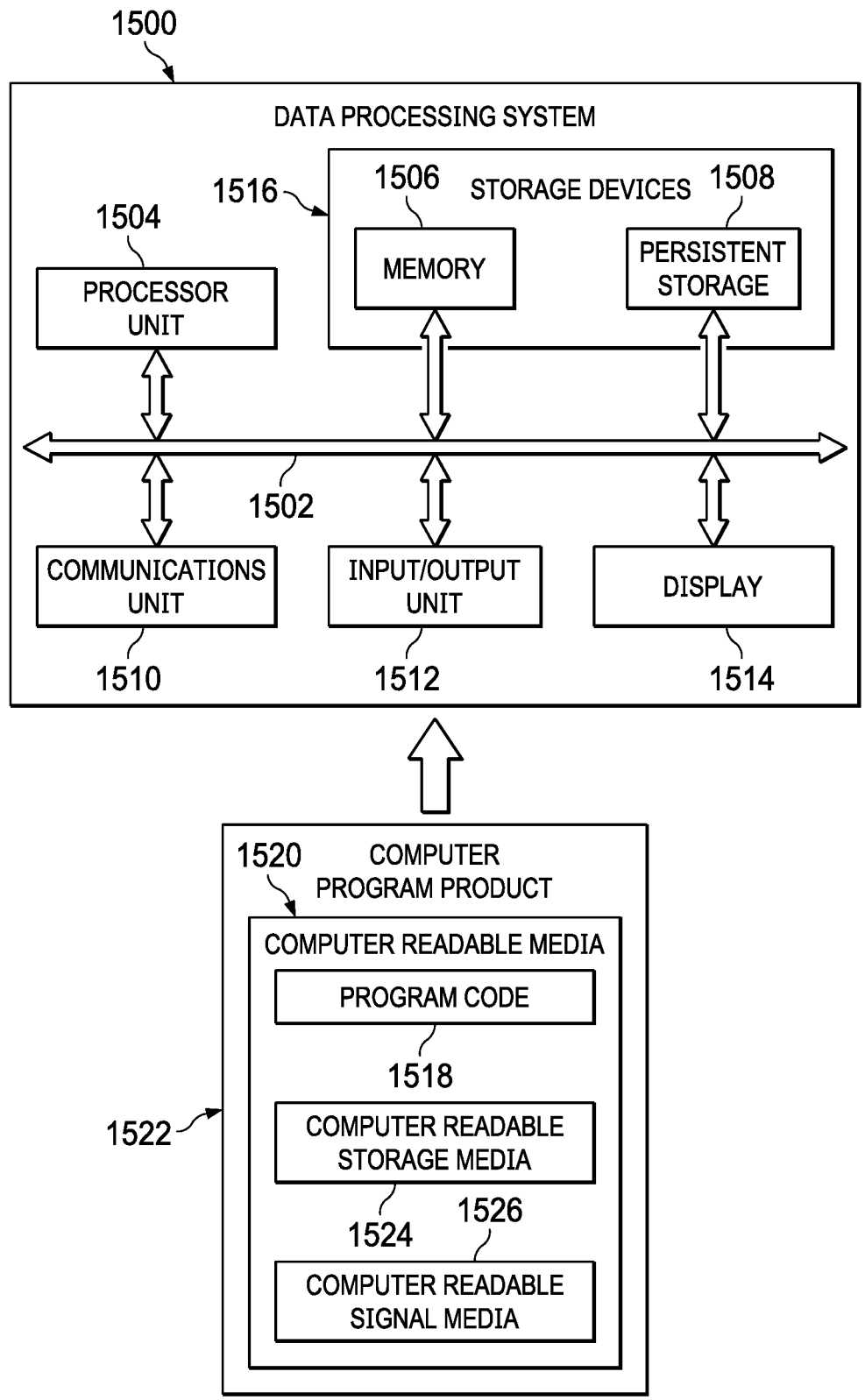
FIG. 15 is an illustration of a block diagram of a data processing system in accordance with an illustrative embodiment.

Turning now to FIG. 15, an illustration of a block diagram of a data processing system is depicted in accordance with an illustrative embodiment. Data processing system 1500 may be used to implement one or more computers and client computer system 112 in FIG. 1. In this illustrative example, data processing system 1500 includes communications framework 1502, which provides communications between processor unit 1504, memory 1506, persistent storage 1508, communications unit 1510, input/output unit 1512, and display 1514. In this example, communications framework 1502 may take the form of a bus system.

Processor unit 1504 serves to execute instructions for software that may be loaded into memory 1506. Processor unit 1504 may be a number of processors, a multi-processor core, or some other type of processor, depending on the particular implementation. In an embodiment, processor unit 1504 comprises one or more conventional general purpose central processing units (CPUs). In an alternate embodiment, processor unit 1504 comprises one or more graphical processing units (GPUS).

Memory 1506 and persistent storage 1508 are examples of storage devices 1516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1516 may also be referred to as computer-readable storage devices in these illustrative examples. Memory 1516, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508. Communications unit 1510, in these illustrative examples, provides for communications with other data processing systems or devices. In these illustrative examples, communications unit 1510 is a network interface card.

Input/output unit 1512 allows for input and output of data with other devices that may be connected to data processing system 1500. For example, input/output unit 1512 may provide a connection for user input through at least one of a keyboard, a mouse, or some other suitable input device. Further, input/output unit 1512 may send output to a printer. Display 1514 provides a mechanism to display information to a user.

Instructions for at least one of the operating system, applications, or programs may be located in storage devices 1516, which are in communication with processor unit 1504 through communications framework 1502. The processes of the different embodiments may be performed by processor unit 1504 using computer-implemented instructions, which may be located in a memory, such as memory 1506.

These instructions are referred to as program code, computer-usable program code, or computer-readable program code that may be read and executed by a processor in processor unit 1504. The program code in the different embodiments may be embodied on different physical or computer-readable storage media, such as memory 1506 or persistent storage 1508.

Program code 1518 is located in a functional form on computer-readable media 1520 that is selectively removable and may be loaded onto or transferred to data processing system 1500 for execution by processor unit 1504. Program code 1518 and computer-readable media 1520 form computer program product 1522 in these illustrative examples. In one example, computer-readable media 1520 may be computer-readable storage media 1524 or computer-readable signal media 1526.

In these illustrative examples, computer-readable storage media 1524 is a physical or tangible storage device used to store program code 1518 rather than a medium that propagates or transmits program code 1518. Alternatively, program code 1518 may be transferred to data processing system 1500 using computer-readable signal media 1526.

Computer-readable signal media 1526 may be, for example, a propagated data signal containing program code 1518. For example, computer-readable signal media 1526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code 1518.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system, comprising:
one or more processors, coupled with memory, to:
receive first electronic transaction data and corresponding code descriptions for one or more entity networks;
scrub the first electronic transaction data to reduce noise and generate a refined data set;
identify, using an automatic unsupervised semantic matcher, one or more hidden patterns of the refined data set;
cluster, using the automatic unsupervised semantic matcher, at least a portion of the refined data set into a plurality of structured resource codes according to the corresponding code descriptions and the one or more hidden patterns;
label, using the automatic unsupervised semantic matcher, the refined data set to generate a labeled data set comprising a plurality of labels for the plurality of structured resource codes;
divide the labeled data set into a training data set, a validation data set, and a test data set;
build, using machine learning and with the training data set, a neural network model configured to classify electronic transaction data into the plurality of structured resource codes;
tune, using the machine learning and responsive to determining a model fit of the neural network model with the validation data set, a hyperparameter used to build the neural network model;
generate, using the machine learning and the training data set, a tuned neural network model by using the tuned hyperparameter to control a rate of learning of the neural network model based on the model fit;
determine, using the machine learning, the tuned neural network model built with the tuned hyperparameter satisfies an error rate based on the test data set;
classify, responsive to the determination that the tuned neural network model built with the tuned hyperparameter satisfies the error rate, second electronic transaction data for an entity network into the plurality of structured resource codes using the tuned neural network model;
determine, based on the classification of the second electronic transaction data using the tuned neural network model, a value of a first resource code of the plurality of structured resource codes relative to one or more second resource codes of the plurality of structured resource codes; and transmit data packets to cause a display device to display a graphical user interface comprising one or more selectable options configured to adjust, based on the value, a network operation to balance resource allocation of the entity network.

2. The system of claim 1, comprising:
the one or more processors to aggregate the second electronic transaction data for the entity network.

3. The system of claim 1, comprising:
the one or more processors to scrub the first electronic transaction data to remove incomplete data to improve the neural network model built using the machine learning.

4. The system of claim 1, comprising:
the one or more processors to scrub the first electronic transaction data to remove data with a predictive value less than a threshold to improve the neural network model built using the machine learning.

5. The system of claim 1, comprising:
the one or more processors to resolve discrepancies in the plurality of labels of the labeled data set prior to the division of the labeled data set.

6. The system of claim 1, comprising:
the one or more processors to build the neural network model with the training data set by using regularization terms configured to penalize overfitting and provide second-order optimization for the neural network model.

7. The system of claim 1, comprising:
the one or more processors to determine the error rate based on a mean absolute error.

8. The system of claim 1, comprising:
the one or more processors to classify the second electronic transaction data into the plurality of structured resource codes comprising pay codes, benefits codes, health care costs, and deduction codes.

9. The system of claim 1, comprising:
the one or more processors to display, via the graphical user interface presented on a display device, an indication of the value.

10. The system of claim 1, comprising:
the one or more processors to receive, via the graphical user interface, responsive to a selection of the one or more selectable options, an instruction to adjust the network operation of the entity network.

11. A method, comprising:
receiving, by one or more processors coupled with memory, first electronic transaction data and corresponding code descriptions for one or more entity networks;
scrubbing, by the one or more processors, the first electronic transaction data to reduce noise and generate a refined data set;
identifying, by the one or more processors, using an automatic unsupervised semantic matcher, one or more hidden patterns of the refined data set;
clustering, by the one or more processors, using the automatic unsupervised semantic matcher, at least a portion of the refined data set into a plurality of structured resource codes according to the corresponding code descriptions and the one or more hidden patterns;
labelling, by the one or more processors, using the automatic unsupervised semantic matcher, the refined data set to generate a labeled data set comprising a plurality of labels for the plurality of structured resource codes;
dividing, by the one or more processors, the labeled data set into a training data set, a validation data set, and a test data set;
building, by the one or more processors, using machine learning and with the training data set, a neural network model configured to classify electronic transaction data into the plurality of structured resource codes;
tuning, by the one or more processors, using the machine learning and responsive to determining a model fit of the neural network model with the validation data set, a hyperparameter used to build the neural network model;
generating, by the one or more processors, using the machine learning and the training data set, a tuned neural network model by using the tuned hyperparameter to control a rate of learning of the neural network model based on the model fit;
determining, by the one or more processors, using the machine learning, the tuned neural network model built with the tuned hyperparameter satisfies an error rate based on the test data set;
classifying, by the one or more processors, responsive to the determination that the tuned neural network model built with the tuned hyperparameter satisfies the error rate, second electronic transaction data for an entity network into the plurality of structured resource codes using the tuned neural network model;
determining, by the one or more processors, based on the classification of the second electronic transaction data using the tuned neural network model, a value of a first resource code of the plurality of structured resource codes relative to one or more second resource codes of the plurality of structured resource codes; and
transmitting, by the one or more processors, data packets to cause a display device to display a graphical user interface comprising one or more selectable options configured to adjust, based on the value, a network operation to balance resource allocation of the entity network.

12. The method of claim 11, comprising:
aggregating, by the one or more processors, the second electronic transaction data for the entity network.

13. The method of claim 11, comprising:
scrubbing, by the one or more processors, the first electronic transaction data to remove incomplete data to improve the neural network model built using the machine learning.

14. The method of claim 11, comprising:
scrubbing, by the one or more processors, the first electronic transaction data to remove data with a predictive value less than a threshold to improve the neural network model built using the machine learning.

15. The method of claim 11, comprising:
resolving, by the one or more processors, discrepancies in the plurality of labels of the labeled data set prior to the division of the labeled data set.

16. The method of claim 11, comprising:
building, by the one or more processors, the neural network model with the training data set by using regularization terms configured to penalize overfitting and provide second-order optimization for the neural network model.

17. The method of claim 11, comprising:
determining, by the one or more processors, the error rate based on a mean absolute error.

18. The method of claim 11, comprising:

classifying, by the one or more processors, the second electronic transaction data into the plurality of structured resource codes comprising pay codes, benefits codes, health care costs, and deduction codes.

19. The method of claim 11, comprising:

displaying, by the one or more processors, via the graphical user interface presented on the display device, an indication of the value.

20. The method of claim 11, comprising:

receiving, by the one or more processors, via the graphical user interface, responsive to a selection of the one or more selectable options, an instruction to adjust the network operation of the entity network.

\* \* \* \* \*